US007806758B2

(12) United States Patent
Van Luchene

(10) Patent No.: US 7,806,758 B2
(45) Date of Patent: Oct. 5, 2010

(54) VIDEO GAME INCLUDING CHILD CHARACTER GENERATION USING COMBINATION OF PARENT CHARACTER ATTRIBUTES

(75) Inventor: Andrew Stephen Van Luchene, Sante Fe, NM (US)

(73) Assignee: Leviathan Entertainment, LLC, Sante Fe, NM (US)

( * ) Notice: Subject to any disclaimer, the term of this patent is extended or adjusted under 35 U.S.C. 154(b) by 432 days.

(21) Appl. No.: 11/621,880

(22) Filed: Jan. 10, 2007

(65) Prior Publication Data

US 2007/0123327 A1 May 31, 2007

Related U.S. Application Data

(63) Continuation-in-part of application No. 11/368,143, filed on Mar. 3, 2006, now Pat. No. 7,677,974, and a continuation-in-part of application No. 11/355,232, filed on Feb. 14, 2006.

(60) Provisional application No. 60/727,121, filed on Oct. 14, 2005.

(51) Int. Cl.
*G06F 17/00* (2006.01)
(52) U.S. Cl. .......................................................... 463/1
(58) Field of Classification Search ...................... 463/1, 463/2, 5–7, 30–34; 705/1
See application file for complete search history.

(56) References Cited

U.S. PATENT DOCUMENTS

| 6,428,414 | B1 * | 8/2002 | Shimomura et al. ........... 463/31 |
| 6,545,682 | B1 | 4/2003 | Ventrella et al. |
| 6,758,746 | B1 * | 7/2004 | Hunter et al. .................. 463/9 |
| 6,860,807 | B2 * | 3/2005 | Tsuchida ....................... 463/7 |
| 6,935,954 | B2 * | 8/2005 | Sterchi et al. ................. 463/31 |
| 7,025,675 | B2 | 4/2006 | Fogel et al. |
| 7,452,268 | B2 * | 11/2008 | Annunziata .................... 463/1 |
| 2003/0003978 | A1 * | 1/2003 | Tsuchida ....................... 463/7 |
| 2005/0007371 | A1 * | 1/2005 | Nam et al. .................. 345/473 |
| 2006/0003841 | A1 | 1/2006 | Kobayashi et al. |
| 2006/0178217 | A1 | 8/2006 | Jung et al. |
| 2006/0178899 | A1 | 8/2006 | Jung et al. |
| 2006/0178964 | A1 | 8/2006 | Jung et al. |
| 2006/0178965 | A1 | 8/2006 | Jung et al. |
| 2006/0190282 | A1 | 8/2006 | Jung et al. |
| 2006/0190283 | A1 | 8/2006 | Jung et al. |
| 2006/0190284 | A1 | 8/2006 | Jung et al. |
| 2007/0060232 | A1 * | 3/2007 | Sakaguchi et al. ............. 463/8 |
| 2007/0238529 | A1 * | 10/2007 | Iwamoto et al. ............... 463/42 |
| 2009/0029779 | A1 * | 1/2009 | Murase et al. ................ 463/43 |

* cited by examiner

*Primary Examiner*—Ronald Laneau

(57) ABSTRACT

The disclosure provides novel video game methods and systems. The disclosure provides a video game in which a new character can be created using attributes from multiple parent characters. Each character may contribute genetic material in the form of character attributes, which are then passed on to a child character.

17 Claims, No Drawings

VIDEO GAME INCLUDING CHILD CHARACTER GENERATION USING COMBINATION OF PARENT CHARACTER ATTRIBUTES

PRIORITY CLAIM

The following application is a continuation in part to U.S. patent application Ser. No. 11/368,143, "Video Game Methods and System" filed Mar. 7, 2006, which claims priority to U.S. Provisional Application Ser. No. 60/727,121 "Methods, Processes and System to Enhance a Player Experience of a Video Game" filed Oct. 14, 2005. The application is also a continuation-in-part of U.S. patent application Ser. No. 11/355,232 Filed Feb. 14, 2006, which claims priority to U.S. Provisional Application Ser. No. 60/727,121 "Methods, Processes, and System to Enhance a Player Experience of a Video Game," filed Oct. 14, 2005. Each of which is hereby incorporated by reference in their entirety.

BACKGROUND

Video games which are accessible to multiple players via a server are well known. For example, hundreds of thousands of players access games known as massive multi player online games (MMOGs). Players of these games customarily access a game repeatedly (for durations typically ranging from a few minutes to several days) over given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community. The games are often designed such that advancement in the game is based on the benefits received from accumulated game play experience, so that beginning players have an initial disadvantage compared to more experienced players.

It would be advantageous to provide improved methods and apparatus for increasing the enjoyment and/or longevity of video games.

DETAILED DESCRIPTION

Unless stated to the contrary, for the purposes of the present disclosure, the following terms shall have the following definitions:

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus can include, e.g., a processor and those input devices and output devices that are appropriate to perform the method.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Apocalypse—the last era of a game environment

Army—shall mean a group of player characters who have established player to player contracts with a general.

Billing Information—shall mean any information pertaining to billing a player including a billing address, credit card account, bank account, pay pal account or other payment information.

Boss—shall mean a player character that has other player characters working for him under player to player contracts that define benefits for both the employee and boss.

Celebrity Voice—shall mean the voice of a known celebrity in the real world.

Character—shall mean a persona created by a player in a video game.

Character Account—shall mean an account that tracks character attributes.

Character Attribute—shall mean any quality, trait, feature or characteristic a particular Character can have that is stored in the corresponding Character Account. Character Attributes shall include, but not be limited to:

A character score
A virtual object
The physical appearance of a character
An emblem or mark
A synthetic voice
Virtual money
Virtual help points or credits
The ability to join groups of other players at a later time
A score for subsequent matching of later game parameters
A relationship with another character
A genetic profile or makeup Character Life—shall mean a fixed period of virtual or real world time that a player character can exist in a game environment.

Character Skills—shall mean game attributes inherent or acquired by a player character during game play such as, but not limited to: the ability to cast certain spells, foretell the future, read minds, use certain weapons, cook, hunt, find herbs, assemble herbs into potions, mine, assemble objects into other objects, fly, and/or enchant other player characters.

Chat Room—shall mean an online forum where Characters can speak in written or spoken voice format.

Child—shall mean a first player character that has entered the game environment because a second and third player characters have completed a defined list of game parameters that allow the second and third player characters to be the parents of the first player character. A parent/child relationship is established via a player to player contract that defines benefits for both parties.

Chromosome—shall mean an attribute, or portion of an attribute of a player character that can be passed on to a second player character if the second player character is a child of the first player character.

City—a group of one or more buildings that is placed in a territory

Class—shall mean a certain type of character status or caste such as, but not limited to, warriors, paladins, rogues, thieves, wizards, or healers.

Coach—is a player character that can assemble a team of other player characters via a player to player contract.

Computer Generated Character—shall mean any character that is generated by the system rather than being another player character.

Death—shall mean the end of the character life of a character.

Divorce—shall mean the dissolution of a marriage contract between two player characters. The player-to-player contract that establishes a marriage can include clauses that define what each player receives in the event of a divorce.

Employee—shall mean a player character who has agreed to work for a second player character under a player to player contract that defines benefits for the both the employee and boss.

Expert Player—shall mean a player that is flagged as an expert for a given Game Parameter.

Family Member—shall mean a player character that has a parent/child relationship with one or more other player characters in the same family tree.

Family Tree—shall mean the organization of a group of player characters each of which has at least one parent/child relationship with another player character in the family tree.

Game Era—shall mean a duration of virtual or actual time in a game environment in which certain game parameters are available to player characters.

Game Parameter—shall mean any part of a Video Game by which characters can be measured. Game Parameters shall include, but not be limited to:

Completing all or part of a mission
Playing for a certain period of time
Winning a match against another player character or computer generated character
Reaching a certain level or score
using or obtaining an ability or technology
kill/death ratios
obtaining an object
solving a puzzle
accuracy with weapons
effective use of the proper weapon
killing a certain character creature
getting through or to a certain geographic area
decreasing or increasing Karma Points
getting, buying, exchanging or learning a new skill or player attribute
having a child
getting married
obtaining, buying, trading, producing or developing raw materials
producing goods or services
earning income
earning a higher rank in an army
winning an election among two or more player characters
achieving deity status
improving player character status or caste
assisting other player characters with any of the above
speed of accomplishing any of the above Gender—shall mean a certain type of character such as, but not limited to, male or female.

General—shall mean a first player character who has established at least one player to player contract with another player character who is a soldier in the first player character's army.

God—Shall mean a player character that has the ability to establish conditions and game parameters in a game environment.

Government Official—Shall mean a player character that has the ability to define game parameters for other player characters.

Guild—shall mean a group of player characters who have elected to work as a team. Teams can include super groups, as those allowed in City of Heroes, Guilds, as those allowed in World of Warcraft, or Corporations, as those allowed in Eve Online.

Help Account—shall mean a sub-account of a Character Account that tracks Help Points acquired by a Character by assisting other Characters Help Credit—shall mean a credit in a Character Account acquired by successfully assisting another Character.

Help Point—shall mean a point acquired by a Character by assisting other Characters.

Inheritance—shall mean the character attributes owned by a particular player character when they die that is passed on to one or more Inheritors.

Inheritor—shall mean any player character that has been linked to a character attribute in a will, or absent a will, to the children of the dead player character.

In-game Marketplace—shall mean a virtual environment where Characters can exchange Attributes.

In-Game Voice Software—shall mean software that players can use to speak and listen to other Players whose Characters are interacting in a Video Game Environment.

Karma Points—shall mean points attributed to a player character based on how that player character performs under the player to player contracts he has established.

Marriage—shall mean a virtual contract between two players that allows them to select other player characters entering the game environment as children. A marriage is established between two player characters via a player to player contract that defines the benefits for both parties.

Massive Multi Player Online Video Game—Shall mean a Video Game that is played using either a network of a Video Game Central Server and at least two Video Game Consuls or a peer-to-peer network of at least two Video Game Consuls. Players create Characters that may interact with each other in a Video Game Environment that is stored on the Video Game Central Server and the Video Game Consuls.

Mission—a game parameter that a player character can complete to achieve game attributes Natural Resources—raw materials that can be removed from a territory Novice Player—Shall mean a player that is flagged as requiring the help of an expert to complete a Game Parameter.

NPC—(non player character) a computer generated character in the game

Parent—shall mean a player character that has completed a defined list of game parameters that allow that player character to designate another player character as a child. A parent/child relationship is established via a player to player contract that defines benefits for both parties.

Player—shall mean an individual who can register an account with a Video Game Central Server or within a peer-to-peer network and create Characters that can interact with other Characters in a Video Game Environment.

Player Account—Shall mean an account on the Video Game Central Server or within a peer-to-peer network that contains a Player profile including personal, billing, and character account information.

Player Attribute—shall mean any attribute that can be applied to a player account. Player Attributes shall include, but not be limited to:

Real Money
Discount of monthly fees for playing game
Monthly fee for playing a game
Global character attribute settings for all characters created by player across multiple games.
Rewards for encouraging another player to signup to play Player to Player Contract—shall mean a virtual but binding contract between player characters that allows the players to provide or exchange game attributes to one another. Once a player-to-player contract is established, the game server or peer-to-peer network automatically distributes acquired game attributes between the player characters based on the contract conditions.

Race—shall mean a certain type of character such as, but not limited to, humans, elves, dwarves, Halflings, undead, tauren, or orc.

Reincarnation—shall mean the ability of a player character to reinsert himself into his family tree as a child of any player characters in his family tree that are married.

Relationship—shall mean a link between two player characters that includes, but is not limited to: parent/child, marriage, boss/employee, slave/master, and army general/army soldier.

Saved Game Result—shall mean the storage of a completed game parameter in a file.

Soldier—shall mean a player character who has established a player to player contract with a general.

Synthetic Voice—shall mean the voice generated by converting a text file with a synthetic voice profile into a spoken word or phrase.

Team—Shall mean a group of player characters who have established player to player contracts with a coach.

Technology—a skill that a player character, family, city, or race can use to build new game attributes Territory—shall mean the virtual two or three dimensional space that is owned by a race or group of player characters in a game environment Text to Voice Software—shall mean software that can convert a text file with a synthetic voice profile into a spoken word or phrase.

Video Game—shall mean a game played on a Video Game Consul that may or may not be networked to a Video Game Central Server or within a peer-to-peer network.

Video Game Consul—shall mean a device comprising a CPU, memory and optional permanent storage residing at a player location that can allow for the playing of video games. Examples include, home PCs, Microsoft Xbox, and Sony Playstation.

Video Game Central Server—shall mean a CPU, memory and permanent or temporary storage that is connected to multiple Video Game Consuls that allows for Massive Multi Player Online Video Games to be played.

Video Game Environment—Shall mean a virtual video game world that is stored on the combination of the Video Game Central Server and Video Game Consuls where Characters interact and games are played.

Virtual Will—shall mean a virtual document that establishes which character attributes of a first player character shall be distributed to specific other player characters in the event of death of the first player character. Absent a Virtual Will, a Default Will shall prevail to determine attribute distribution to a character's heirs.

Voice Recognition Software—shall mean software that can convert a spoken voice into text and/or text into a spoken synthetic voice using a synthetic voice profile.

Voice to Text Software—shall mean software that can convert a spoken voice file into a text file.

According to one embodiment methods and systems are disclosed that allow player characters in a massive multi player online video game to create relationships with each other. Examples of the types of relationships that can be created are:

1. Marriage
2. Parent/Child
3. Slave/Master
4. Affair
5. Enchanter/Enchanted
6. Boss/Employee
7. Gods/Worshipers
8. Government Officials
9. Sports Teams/Coaches
10. Guilds
11. General/Army According to one embodiment, when a player character reaches a certain level in a video game, he is allowed the opportunity to have one or more of the above relationships with another player character. These relationships can be defined and/or limited by the player character's race and class in the game. Some of these relationships can allow the player character to develop additional relationships with subsequent player characters. These additional relationships may require the player character to reach another level in the game. Some levels of the game may be unobtainable by the player character unless they have developed certain relationships with other characters. Certain of these relationships may prevent or preclude certain other relationships with other player characters.

Relationships between player characters can provide additional benefits to one or more of the player characters in the relationship. Non-limiting examples of these benefits include:

1. A player character can receive some or all of the character attributes generated by another player character if they have a relationship (master/slave)
2. Player characters can have additional relationships with other player characters if they have a relationship with each other (marriage/children)
3. Attributes of a player character can be enhanced, modified, or transferred if they have a relationship with another character (children inherit attributes of parents)
4. The race or class of the player character can be altered as long as they have a relationship with another character (undead possess living player characters)
5. A player character can shorten, lengthen, or restart the life of another player character if they have a relationship (doctor/patient)
6. A player character cannot reach subsequent levels of a game or acquire certain character attributes unless they have one or more relationships with other characters. (mayor of city must have a wife and child)

Alternatively or additionally, relationships between characters can be limited based on character attributes including:

1. The race of the character
2. The class of the character
3. The number of player characters playing the game
4. The level of a player character
5. Whether or not a player character has a certain attribute or collection of attributes
6. Whether or not a player character has successfully completed a game parameter
7. How many hours the player plays with the player character in a given time period According to another embodiment, relationships between characters can be lost according to certain game parameters. Examples of the types of game parameters according to which a relationship might be lost include, but are not limited to:

1. One of the characters in the relationship has the authority to sever the relationship and does so.
2. One of the characters in the relationship cancels his account with the game server
3. One of the characters in the relationship does not log enough play time in a given time period
4. Both of the characters mutually request and agree to sever the relationship
5. Other characters establish a relationship with a character that severs their relationship with the first character
6. A certain time period of real time or game time has lapsed
7. One character pays or fails to pay or provide a certain amount or number of attributes to the other character, then their relationship may be severed.

According to one embodiment, relationships may be established in a variety of ways. Examples of ways in which relationships between characters can be established include, but are not limited to:

1. By an in game negotiated virtual contract between the two player characters
2. Randomly or under proscribed rules controlled by the game server or within a peer-to-peer network
3. By a structure of rules defined by the game players, game server, or within a peer-to-peer network or a combination of these
4. When a new player character is created in the game, relationships are automatically established by the game server or within a peer-to-peer network between that character and the existing character's within the game.

According to one embodiment, each type of relationship may be defined and/or governed by various rules and/or limitations. Below are listed examples of relationships and governing rules and limitations for those relationships. It will be understood, however, that such relationships and limitations are provided only as examples of the types of relationships and limitations that could be used in a game and that none of the examples below should be construed as requirements for the embodiment. It will be further understood that rules and limitations may be added or deleted, individually or in groups, and that such rules and limitations may be static or fluid.

Marriage—Two players in a game reach a certain level of the game and are qualified to be married. The characters log in to a special screen of the game that displays other characters that are available to be married. Characters can display conditions for the marriage i.e. they need a certain dowry, prenuptials or will only marry a character of a certain class or level, or with sufficient resources, income or skills to contribute to the marriage. A player character can accept a marriage proposal or submit a counter offer. When both players agree to the terms of the marriage, then the system sets a flag in both of the character accounts indicating their newly formed relationship.

Different types of characters could have different marriage arrangements. For instance Taurens could be married to more than one other character, while Elves could only be married to one other character. Humans could get married at level 10 while elves could be married at level 15. Some races could have multiple marriages with fixed time limits.

Parent/Child—Once two players have been married; they can have children once one or both of them have reached a certain level of the game. Once one or both characters have reached a proscribed level of the game, their character accounts are flagged as being eligible to have children. A new player character formed by a new player can only come into the game when two other players are eligible to have a child and agree to have a child. A new player can specify what gender, race and class he wants his player character (child) to be. The system can display what gender, races and classes need or want more children by displaying the family trees of player characters already in the game that are married and that desire children. Parents can only have children within a certain subset of classes. For instance a rogue and a wizard can only have warriors and paladins as children, etc. Additional criteria can be set up by the new player or the parents to further establish the relationship between them. For instance, parents can set up a contract with the child so that they take a certain percentage of his experience or game attributes, but agree to leave all of their wealth to the child in their will when they die. New characters can set parameters for becoming a child, for instance, the new player child may agree to give his parent(s) a certain percentage of his future experience points, in exchange for certain attributes or other tangible or intangible property when his parent(s) acquire them. Once the parents and the child have agreed to a contract, the new player character is born into the game and is added to the family tree of the parents. The new child may then begin to play the game and strive to gain wealth and attributes, etc.

New player characters can only be added to the game environment by being offspring of other player characters. New players can elect to give a greater amount of their experience or game attributes to parents who are in a good family or who otherwise have desirable traits, attributes, wealth, etc. According to this example, so called "bad families" will have a cheaper "barrier to entry" for new players than "good families." A player can set up a profile of the type of character they want. When a married couple in the game is able to have a child, the new player character requests are analyzed and new children are created according to new player preferences. A new player can choose to have his player inserted into different ages based on different servers.

Some characters may be able to spawn children without marriages. For example, some races may not require the union of two characters in order for a parent to have a child. In these cases, children entering the game may suffer from deficits in income, attributes, or other characteristics. These deficits may plague the player throughout his life or only during childhood. An advantage of becoming a child out of wedlock is that there is no or little barrier to entry.

Slave/Master—A first player character may be captured by a second player character in the game. The first player character is made a slave to the second player character and some or all of his experience and attributes are given to his master until he is freed. A slave can be freed if a member of his family or the slave if a ransom is paid. The master can put out a ransom note, or he can keep it a secret that he has captured the first player character as a slave. Family members of the slave or the slave himself can log in to a special screen in the game to view the conditions of the ransom to free the slave/himself. If the family members or the slave agree to the conditions of the ransom, they can free the slave/himself. They can also free the slave by recapturing him in the game. All the slaves of a given race may be freed based upon the outcome of a war. If a General and his Army defeats another General's Army, the victorious General may choose to free all the slaves of the other race through an "emancipation proclamation." Slaves freed in this fashion will have all that was taken from them, plus optional penalties that are established by the Game Server or within a peer-to-peer network or as otherwise agreed upon by the players. Alternatively, Generals may agree to conditions of surrender, which may determine the disposition of any slaves or other spoils of war. In such case, slaves may be freed but they may receive only a portion or none of their previously lost wealth or other attributes.

Slaves may be subject to various penalties or governed by additional game rules while they are being held in slavery. Examples of the types of penalties or additional game rules to which a slave might be subjected include, but are not limited to:

1. Slaves can play in the game in a limited capacity until they are free.
2. Slaves can be cut off from communication with their family.
3. Slaves can commit suicide to start over in the game. (This could result in bad karma for the player character resulting in a low reentry status.)
4. Slaves can create their own contracts with other player characters who can free them from being slaves.
5. Slaves can bargain with their masters to free them for a proscribed initial or future, i.e., to be paid price.
6. A slave can also be sold by its master to another master by posting the slave for sale on a special marketplace.

Affair—In some instances, a married couple may not be able to produce offspring that compliment their team fighting abilities. For instance, a family may need more healers to have a well rounded fighting force, but none of the parents can have healers as children based on their classes. In this instance, a player character, once he reaches a certain level, can have an affair with a family member of another family so that they can have children of a specific class that they could not otherwise have. Children generated in this manner are members of both families. The stronger family has the right to absorb the bastard player into their family first. The concubine or weaker player character can negotiate a contract with the stronger player character in order to provide a bastard child to his family. In this manner, a family lacking in a certain class of character can go outside the family to generate those class types in their family, but must pay for the privilege by providing game attributes to the non family member who agrees to have the affair.

Incest. Absent all other options to bear children, close family members may have children. In such cases, the offspring shall be created in a manner similar to all other child bearing methods, except that, there shall be a greater probability of the offspring being defective in one or more ways. Such defects might include an inability to obtain certain attributes or use certain objects, weapons or tools. Another defect type might be a general constraint on the speed with which a child achieves various objectives, levels, karma, or other attributes. The degree to which these defects manifest themselves in such offspring may be determined randomly or predetermined by a set of rules enforced by the server or peer-to-peer network, Enchanter/Enchanted—Undead players can build up their army/family by enchanting other player characters. When an undead character reaches a certain level, they are eligible to enchant a "living" player character and cause them to be undead. These newly undead players than are removed from their current family tree and added to the undead family tree. To become living again, an undead player would have to be unenchanted by a device or spell provided by his family or by paying another Enchanter to provide the spell for a fee. Alternatively, once a player character has become undead, their family can only kill them and allow them to be reentered into their family further down the family tree via reincarnation.

If an undead character is killed, then the undead character that created him can be allowed to make another character undead. I.e. an undead character who has earned a credit to enchant a living character can reuse it if that living character that has become undead is killed.

Gods/Worshipers—Some characters, i.e. the first characters that sign on to a server, can be made Gods of their races. These gods can have some control of rules governing the entire game environment and can also bless or curse characters. Player characters can become blessed by offering attributes to the gods. They can nullify a curse by offering attributes to a god. Gods may be player characters or, in certain game versions, NPCs.

The goals of Gods are that their race rules the world. They can add extra incentives to parent/child contracts so that new player characters join their race over other alternative races.

Gods can battle one another and their strength is based on the strength of the families in their races.

Only a certain x number of characters can be gods in a given game environment.

Boss/Employee—in a mafia type game, new player characters can be introduced into a game as employees of a boss. Once player characters reach certain levels or acquire certain attributes in a game environment, they are eligible to take on new players as employees. Employees have to give a certain amount of the experience or game attributes they acquire to their boss in exchange for the position and/or protection. If either party fails to fulfill the terms of the contract, the contract can be nullified and his boss no longer employs the employee. The contract may include terms that control contract dissolution.

In a fantasy game such as World of Warcraft, player characters can be hired as soldiers to other player characters and fight for their army under an agreed upon contract. Characters log in to a special screen in the game to view employment contracts of other player characters.

Government Officials—Members of families who are strong qualify to be part of a race's government. Different races have different government structures. I.e. some governments require that all members of a race vote for someone to become a government official while others, the strongest players are automatically allowed into government positions.

For example, the human race can have a republic government with votes for party members. The Tauren race can have a monarchy and determine government position based on which player is the strongest.

Player's characters could also race to achieve certain levels in the game. The first person to reach a certain level in the game is allowed to be a government official over other characters in the game. A government official may be able to take an experience or attribute tax from other players. Player characters may challenge current government officials in future elections, which may occur at prescribed times/dates or when a majority of players in a given race agree to hold new elections.

Divorces—two player characters that are married can go to a virtual or player character judge who can split up their attributes if they want a divorce. Alternatively, if the married couple entered into a prenuptial agreement, that agreement shall govern the split up of their attributes upon entering into a divorce.

Sports Teams/Coaches—In a game that has teams or armies, a coach can recruit new player characters to be on his team based on how well his team is doing against other teams/armies. A coach can receive points for winning matches and, when a certain number of points have been obtained, he is entitled to recruit new player characters to be on his team/army. In this embodiment, player characters can be traded from one team to the next.

Examples of assets or value that might be used to trade player characters include, but are not limited to:
1. Other player characters
2. Game Points
3. Game Credits
4. Attributes According to this embodiment, there may be a virtual bench from which coaches can recruit if they are having a successful season. Alternatively, player characters could only be added to a team if other player characters could no longer play on a team due to injury or death.

Alternatively or additionally, as an option to help improve the overall competitiveness of a given team, the Game Server or peer-to-peer network may randomly, or based upon preset conditions, grant a coach the right to obtain one or more additional players with specific skill sets. As an example, if one team were to become so strong that they consistently dominate all other teams, the Game Server or peer-to-peer network may grant one or more of the underperforming teams the right to add sufficient additional players with appropriate skills and experience so as to make them better able to compete against the dominate team.

Guilds—A player character in charge of a guild cannot add other player characters unless either he or his guild have obtained a certain level in the game, completed certain game parameters, or acquired enough game attributes to qualify to add characters to the guild. New player characters coming into the guild can do so with a contract that can be negotiated before they join the game environment. Players in a guild can renegotiate contracts with their guild, or can be recruited to other guilds who offer competitive contracts.

General/Soldier—A player character who is a general can recruit new player characters into his army when he successfully defeats another army in combat. New player characters entering the game environment can elect to join an army based on available slots and offers in contracts. A weaker army would have to give more to new recruits in order to have them join. A contract to join an army could include:
1. A rank or position in the army
2. A salary
3. A % of spoils obtained by the army
4. One or more attributes (swords, etc)

Alternatively, or additionally, to help ensure competitiveness among armies, the Game Server or peer-to-peer network may randomly or via proscribed rules, grant rights to underperforming teams to obtain new soldiers for free or for reduced fees.

According to yet another embodiment, the game rules may specify that a player character cannot enter the game environment unless a relationship is established between one or more player characters already in the game environment and himself. For example, the game rules may state that a player character has to enter the game as a child of two other player characters.

As a further embodiment, when two player characters are eligible to have offspring, the system can randomly insert twins a certain x number of times in the game. A twin may be another player character or an NPC.

Accordingly, contracts between player characters may be formed in a wide variety of ways including, for example and without limitations, by the game server, within a peer-to-peer network, or by player characters via a trade or exchange service.

According to one embodiment, a player character can view his family tree at any time during game play by logging in to a special family tree page.

According to another embodiment, a player character can be a god in the game and determine rules and settings that other player characters abide by. Accordingly, certain players, e.g. those with the oldest game accounts may be able to reach or achieve a god level that presides over other game players and manages player and game mechanics such as population growth. Thus, a god level player may, for example, have choices as to how new offspring are born into the game.

According to another embodiment, certain attributes, classes, and special powers may only be available to player characters that have certain characteristics or attributes such as, for example and without limitations, players with a certain number of ancestors or who have been reincarnated a certain number of times.

Sexes and classes can be selected by any desired means, including, for example, by the character or randomly by the system.

According to one embodiment, characters may be generated as children based on genetically crossbreeding the parents. According to one method of this embodiment lists of player attributes for both parents are generated and random or average selections from both parents are compiled to form the child. Each attribute of the parent can be specified by the game server as dominant or recessive. The child created by the union receives one chromosome from each player character parent. Depending on which attributes are considered dominant and recessive, when the child is generated by the chromosomes of his parents, his attributes are determined. This embodiment also allows for mutations from one generation to the next. Mutations randomly occur and provide new or enhanced attributes to the offspring of the children.

Certain toys or other in game or out of game attributes can only be available to characters and players in certain family trees or to those who achieve certain levels, obtain certain attributes, or acquire required virtual objects, which may be exchanged for tangible goods and services.

According to one embodiment, player characters could only be allowed to be inserted in the game with particular characteristics, for example, as a particular race of the game.

Populations may be managed so that no race in a game environment dominates all other races or grows faster than other races. With this limitation enabled, even if player characters reach the required level in the game where they qualify to have a child, they may not be able to have a child if their race has a population substantially or unfairly greater than other races in the game. In this manner, the game server or peer-to-peer network can manage the number of player characters in each race, and even in each class of each race. Alternatively, player characters that are citizens of a particular city in a game may only have children when both (i) they qualify and (ii) the city is large/healthy enough to support additional player character populations.

According to anther embodiment, all, an average, or a portion of the attributes of parents can be passed on to their children. For example, a parent with an intelligence level of 12 can pass on 50% of his intelligence level to his child. As player characters age, attributes such as intelligence increase, so an older player character can pass on greater attribute levels than a younger player character.

According to another embodiment, in some ages and races, a player character can be too old to establish a relationship with another player character, even if his level allows it.

According to another embodiment, under certain game conditions, different races or classes of characters can have a child together, the offspring of which forms a new race. I.e. in the third era of a game, elves and humans can mate to form Halflings.

According to yet another embodiment, players could pay an extra fee for an account that allows their player characters to have certain relationships with other player characters.

According to another embodiment, the entire group of characters that have a relationship (i.e. family or army) may have to reach certain cumulative experience or game level in order to add new characters to the group. Alternatively, a certain number of characters in the group may have to have a certain amount of experience or have obtained a certain level in the game before they, or other members of the group can have relationships with new or existing player characters.

Accordingly, the present disclosure provides for hardware and software that can be utilized to create one or more, or a combination of, any of the above-described embodiments. Non-limiting examples of software programs that might be used for the realization of the above embodiments include, but are not limited to:

Game Environment Program
Billing Program
Character Relationship Program
Character Profile and Management Program Examples of databases that might be used for the realization of the above embodiments include, but are not limited to:

Player Database including, for example:
    Player GUID
    Player Billing Info
    Player Characters 1-N
    Account Type
Player Character Database including, for example:
    Player GUID
    Character GUID
    Character Attributes 1-n
    Character Skills 1-n with Current Level 1-n
    Character Relationship(s) 1-n (tree)
    Relationship Type(s) 1-n
Relationship Type Database including, for example:
    Relationship Type ID
    Relationship Type Name
    Relationship Type Conditions/Restrictions 1-n
Relationship Contract Database including, for example:
    Relationship Contract ID
    Relationship Character 1-n (tree)
    Relationship Conditions 1-n
Player Character Family Tree Database including, for example:
    Player Character ID
    Player Character Relationship 1-n (tree)

The present disclosure further provides methods by which the embodiments described above, alone or in combination, may be realized. Examples of methods that may be employed include, but are not limited to:

A method to determine eligibility to form a relationship comprising:
retrieving Player Character attributes 1-n,
determining if attributes qualify for a relationship, and
If attributes qualify for a relationship,
    flagging the character account as eligible for a relationship; and
    outputting the relationship availability to the player character.
A method to create a contract to establish relationship comprising:
retrieving a request to form a relationship contract,
outputting the relationship contract parameters,
receiving relationship contract conditions; and creating new relationship contract record.

A method to form a relationship comprising:
retrieving a request to view relationship contracts,
determining relationship contracts availability based on player character account and relationship contract conditions,
outputting available relationship contracts,
receiving an indication of acceptance of a relationship contract or a counter offer, creating a relationship based on agreed upon contract conditions; and
updating the relationship contract record.
A method for a character to sever a relationship comprising:
receiving a request to sever a relationship contract,
determine if the request is permitted based upon relationship contract conditions, and
if the request is permitted,
    severing the relationship, and
if the request is not permitted,
    outputting additional conditions that must be met in order for relationship to be severed; and
    updating the relationship contract record.
A method for a server to sever a relationship comprising:
retrieving a relationship contract,
determine if the contract is eligible to be severed,
outputting the offer to sever contract to player characters, and
if offer is accepted,
    severing the contract and updating relationship contract record.
A method for creating a child character based on attributes of parent characters comprising:
determining that a child relationship contract is available for two player characters, receiving an indication that a player character desires to be a child of two player characters,
generating a genetic profile of the child player character based in part on the genetic profile of the parent player characters, and
creating a child player character with genetic profile.
A method to create a new player character related to existing player characters comprises:
determining that a child relationship is available for one or more player characters,
receiving (or generating) child relationship contract conditions,
creating a child relationship contract,
receiving a new player character request,
outputting available child relationship contracts,
receiving an acceptance of the child relationship contract, and
creating a new player character that is a child of one or more existing player characters.
A method to allow a player character to receive game attributes for completing a game parameter only if relationship with other player character exists comprising:
receiving an indication that a game parameter has been completed by a player character,
determining if the player character has a relationship with another player character, and
if a relationship exists, releasing available game attributes for successful completion of game parameter.
A method to allow player character to attempt to complete a game parameter only if relationship with other player character exists comprising:
receiving a request to attempt to complete a game parameter,
determining if the player character has a relationship with another player character,
outputting a "game parameter requires relationship message" if character does not have a relationship with another player character; and
initiating game parameter if player character has a relationship with another player character.

According to a further embodiment, the present disclosure provides methods and systems to allow for genetic crossbreeding of parents to form children in a video game.

In this embodiment, player characters in a video game are assigned two chromosomes for each appropriate attribute they possess. When two player characters have reached an appropriate level in a game and are eligible to have a child, the attributes of the child are generated by taking one chromosome from each parent and combining them to form the attributes for the child.

Appropriate attributes can include but are not limited to:
the physical appearance of the character including skin, height, weight,
hair and eye color
the race of the character
the class of the character
the skills of the character
the strength, intelligence, stamina, wit, charisma, agility, etc of the
character
the ability to improve any of said skills According to another embodiment, rather than having two chromosomes of an attribute, the system can take the average attribute score provided by the two parents, or randomly select within a range between the two attribute scores of the parents in order to determine the attribute value of the child. These scores could be determined from the value of the attribute of the parent when the child is conceived, or from the value of the attribute of the parent when his character was created.

According to another embodiment, the current value, score or level of each parent's attributes may be used to determine which chromosomes are dominant or recessive.

According to another embodiment, the system could determine which attributes are more fully developed in a given child based upon environmental considerations such as how often the child employs or uses a given attribute. Those attributes used most often during childhood can develop more fully while those less used may wane over time. The net overall growth of any given skill or attribute can therefore be a combination of the general proclivity to perform well as inherited from each parent and the child's use or actual development of said skill or attribute.

According to another embodiment, the system can randomly inject mutations into the attribute determination process so that children are not completely a product of the attributes of their parents. For instance, new attributes or different attributes can randomly occur in offspring. As an example, these mutations can occur:
1. Randomly
2. A certain number of times with each level of a family tree
3. A certain number of times in an era of the game
4. A certain number of times within each race and class of the game
5. More or less often depending on a character's race, class or family
6. More or less often depending on the era of the game environment
7. More or less often depending upon the child's actual usage or other development efforts.

8. Any combination of the above

According to another embodiment, particular attributes can have recessive and dominant chromosomes that mirror real life traits. For instance blue eyes are recessive and brown eyes are dominant. Alternatively, this may be determined by established game rules and/or based upon parent's success and/or the child's environmental development as previously described.

According to another embodiment, before marrying or choosing to be a child of another player character, an existing or potential player character can view the genetic make up of the attributes of a player character, and, optionally, run a program to calculate the probabilities that a child will have certain attributes and characteristics given the known makeup of the parents.

According to another embodiment, the cost of marrying or being a child of a particular player character can be set by the system based on the attributes of the character and how desirable they are to have in potential offspring. According to another embodiment, Artificial Intelligence or Genetic Algorithms can be applied to this process to make it more rich and complex.

Accordingly, the present disclosure provides for hardware and software that can be utilized to create one or more, or a combination of, any of the above-described embodiments. Non-limiting examples of software programs that might be used for the realization of the above embodiments include, but are not limited to:

1. Game Program
2. New Character Creation Program

Examples of databases that might be used for the realization of the above embodiments include, but are not limited to:

1. Character Database including, for example
2. Character ID
3. Character inheritable attributes 1-n
4. Character Chromosomes
5. Mutation Database including, for example
6. Mutation ID
7. Mutation descriptor
8. Mutation attributes 1-n The present disclosure further provides methods by which the embodiments described above, alone or in combination, may be realized. Examples of methods that may be employed include, but are not limited to:

A method comprising:
Receive request to create new player character from one or more existing player characters
Determine if one or more existing player characters qualify to create new player character
If existing player(s) qualify retrieve inheritable attributes:
  Apply new character creation program to attributes
    Create new player character based on inheritable attributes of existing player character(s) and new character creation program; and
  Allow new player character to enter game environment
A method to create a new character from chromosomes of parents comprising:
Receive request to create new player character from one or more existing player characters
Determine if existing player character(s) qualify to create new player character
If character(s) qualify,
  retrieve character chromosomes
    Apply new character creation program to character chromosomes
    Create new character based on existing player character chromosomes and new character creation program
  Allow new player character to enter game environment
A method to create a new character from average attributes of parents comprising:
Receive request to create new player character from one or more existing player characters
Determine if existing player character(s) qualify to create new player character
If character(s) qualify,
  retrieve character inheritable attributes
    Generate the average number of each inheritable attribute
    Create new character based on average number of each inheritable attribute and
  Allow new player character to enter game environment
A method to apply a random mutation to a new character comprising:
Receive request to create new player character from one or more existing player characters
Determine if one or more existing player characters qualify to create new player character
If existing player(s) qualify retrieve inheritable attributes
Apply new character creation program to attributes
Retrieve mutation rules
Determine if new character qualifies for mutation based on rules
Create new player character based on inheritable attributes of existing player character(s) new character creation program, and applicable mutation rules
Allow new player character to enter game environment Of course it will be appreciated that such methods are provided for the purposes of example only and that none of the above methods should be interpreted as necessarily requiring any of the included steps nor should they be interpreted as necessarily excluding any additional steps.

The invention is described with reference to several embodiments. However, the invention is not limited to the embodiments disclosed, and those of ordinary skill in the art will recognize that the invention is readily applicable to many other diverse embodiments and applications. Accordingly, the subject matter of the present disclosure includes all novel and nonobvious combinations and subcombinations of the various systems, methods and configurations, and other features, functions, and/or properties disclosed herein.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first"

and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. §1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

What is claimed is:

1. A method performed by a computer, the method comprising;
   providing, by a Video Game Central Server, a video game comprising player characters wherein each player character comprises a plurality of attributes;
   receiving, by the Video Game Central Server, a request from a first parent player character to form a child character;
   identifying, by the Video Game Central Server, first player attributes associated with the first parent player character;
   assigning, by the Video Game Central Server, at least some of the first parent player attributes to the child character;
   receiving, by the Video Game Central Server, a request from a second parent player character to form the child character;
   identifying, by the Video Game Central Server, second player attributes associated with the second parent player character;
   assigning, by the Video Game Central Server, at least some of the first player attributes and at least some of the second player attributes to the child character, in which at least one of the assigned attributes includes a character skill;
   creating the child player character with the assigned player attributes;
      wherein each player character in the game has a set of attributes and each attribute is assigned a score, and
   determining the score of the attributes for the child character based on the scores of the parent characters, which comprises
   taking the average of the scores from the first and second parent characters.

2. The method of claim 1 wherein determining the score of the attributes for the child character based on the scores of the parent characters comprises randomly selecting the score of the first parent character or second parent character for each attribute.

3. The method of claim 1 wherein determining the score of the attributes for the child character based on the scores of the parent characters comprises, for each attribute, randomly selecting a value between first parent character score and the second parent character score.

4. The method of claim 1 wherein the value of each attribute score fluctuates during the game and the value of the parent character attributes that is used to determine the child character attribute scores is the parent attribute score at the time of the child character's conception.

5. The method of claim 4 further comprising fluctuating an attribute score based upon environmental considerations within the game.

6. The method of claim 5 wherein an environmental consideration is how frequently a player character uses a given attribute during the game.

7. The method of claim 1 wherein the value of each attribute score fluctuates during the game and the value of the parent character attributes that is used to determine the child character attribute scores is the parent attribute score at the time of the parent character's conception.

8. The method of claim 1 further comprising:
   identifying some attribute values as being dominant; and
   assigning the dominant attribute value to the child player character when at least one of the parent player characters has the dominant attribute value.

9. The method of claim 1 further comprising:
   identifying some attribute values as being recessive; and
   assigning the recessive attribute value to the child player character only when all of the parent player characters have the recessive attribute value.

10. The method of claim 1 further comprising assigning at least some attributes that are not first or second player attributes to the child character.

11. The method of claim 10 further comprising outputting an attribute profile of the child player character to at least one of the first and second player characters.

12. The method of claim 11 further comprising requesting if the parent player character receiving the attribute profile would like to proceed with the child character creation request.

13. The method of claim 12 further comprising receiving an affirmation that the parent player character would like to proceed with the child character creation request.

14. The method of claim 13 further comprising creating a child player character having the attributes shown in the attribute profile.

15. The method of claim 1 further comprising determining if the parent player character is eligible to form a child character.

16. The method of claim 15 wherein determining if the parent player character is eligible to form a child character comprises determining if the parent player character has entered into an eligible contractual relationship.

17. An apparatus comprising:
 a processor; and
 a computer readable medium in communication with the processor;
 in which the computer readable medium stores instructions which, when executed by the processor, direct the processor to
  provide a video game comprising player characters wherein each player character comprises a plurality of attributes;
  receive a request from a first parent player character to form a child character;
  identify first player attributes associated with the first parent player character;
  assign at least some of the first parent player attributes to the child character;
  receive a request from a second parent player character to form the child character;
  identify second player attributes associated with the second parent player character;
  assign at least some of the first player attributes and at least some of the second player attributes to the child character, in which at least one of the assigned attributes includes a character skill;
  create the child player character with the assigned player attributes;
   wherein each player character in the game has a set of attributes and each attribute is assigned a score, and
  determine the score of the attributes for the child character based on the scores of the parent characters, which comprises
  taking the average of the scores from the first and second parent characters.

* * * * *